United States Patent [19]

Schafer

[11] 4,219,212
[45] Aug. 26, 1980

[54] TRACTOR IMPLEMENT HITCH

[75] Inventor: Richard A. Schafer, Traer, Iowa

[73] Assignee: Deere & Company, Moline, Ill.

[21] Appl. No.: 968,360

[22] Filed: Dec. 11, 1978

[51] Int. Cl.³ .................. A01B 59/043; B60D 1/00
[52] U.S. Cl. ...................... 280/460 A; 180/235; 280/446 A
[58] Field of Search ........... 280/456 R, 456 A, 460 R, 280/460 A, 461 R, 461 A, 490 A; 180/235, 900

[56] References Cited

U.S. PATENT DOCUMENTS

| | | | |
|---|---|---|---|
| 2,393,358 | 1/1946 | Ferguson | 280/461 A |
| 2,653,823 | 9/1953 | Wilson | 280/456 A |
| 2,731,898 | 1/1956 | Frevik | 280/461 A |
| 3,484,964 | 12/1969 | Jeffery | 180/235 |
| 3,787,068 | 1/1974 | Miller | 280/456 R |
| 4,059,283 | 11/1977 | Shelton | 280/461 A |

Primary Examiner—John J. Love
Assistant Examiner—Randall A. Schrecengost

[57] ABSTRACT

An implement hitch for an articulated agricultural four-wheel drive tractor includes draft links secured to the rear section of the tractor by spherical bearings and carrying couplers to connect an implement. Loads applied by the implement act along lines through spherical bearings in the ends of each draft link and extend into the tractor to converge and intersect slightly in front of the rear axle of the rear section of the articulated tractor.

2 Claims, 2 Drawing Figures

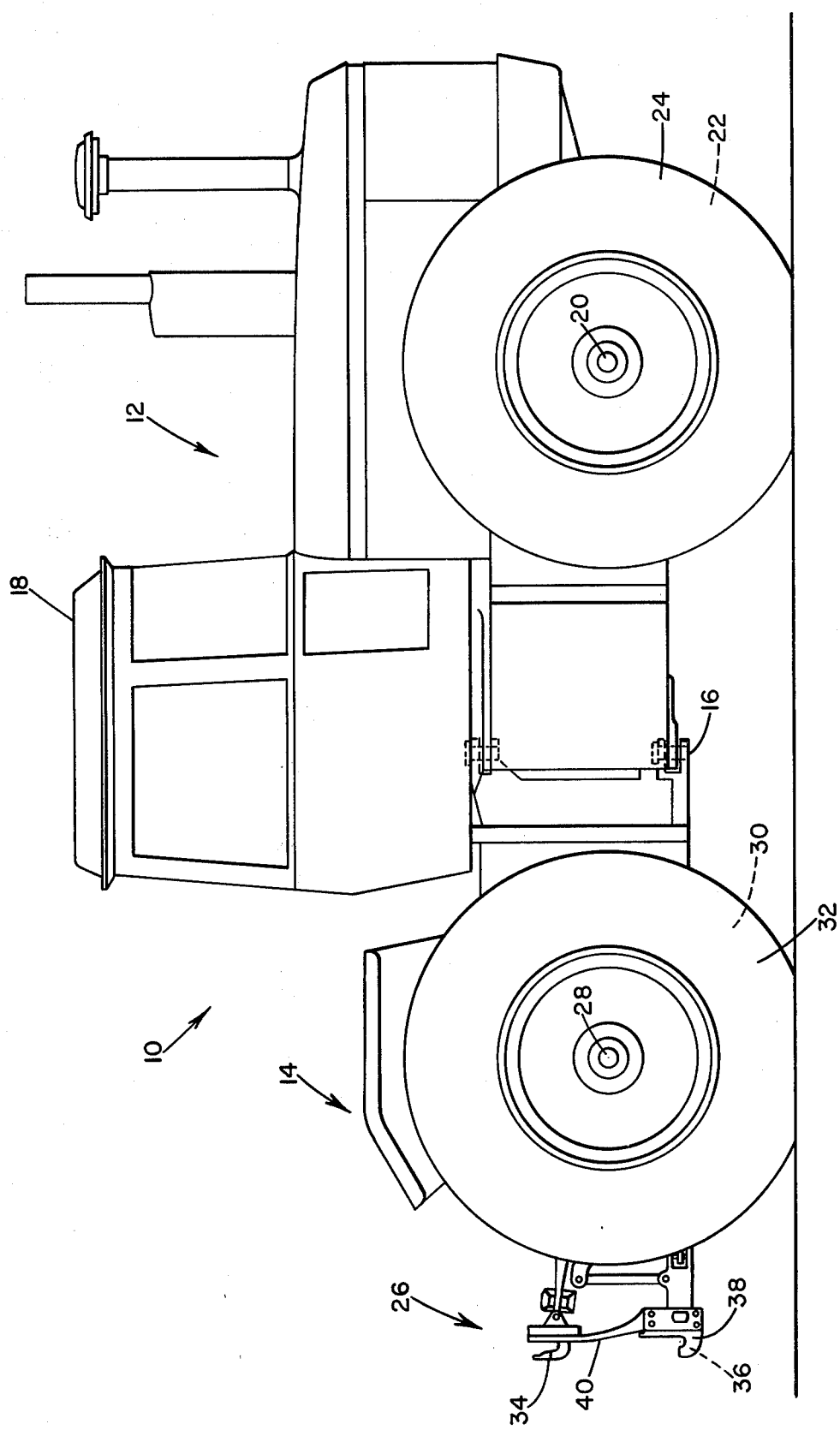

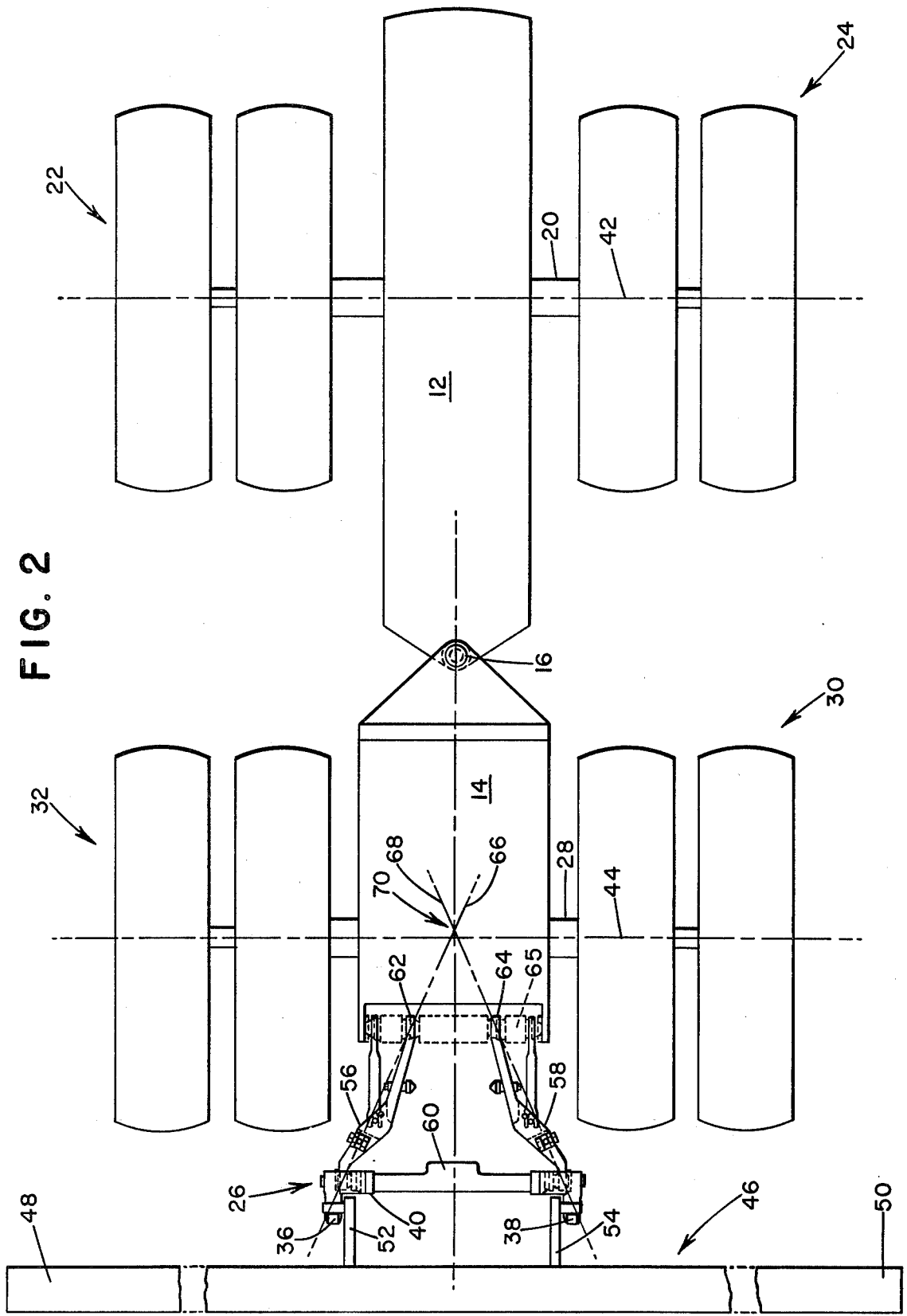

TRACTOR IMPLEMENT HITCH

BACKGROUND OF THE INVENTION

The present invention relates generally to tractor hitches which provide convergence of implement loads in agricultural tractors and more particularly to an implement hitch for an articulated four-wheel drive tractor in which convergence occurs substantially at the rear axle.

In the past, as tractors have become larger, the old hitch configurations have remained substantially unchanged with mere structural upgrading to meet load requirements. With front wheel steered two-wheel drive tractors, the draft link convergence, or the intersection in the tractor body of the lines of force applied at the spherical bearings at the rear end of the draft links, was always approximately at the front axle. This was to assure that when the front wheels were turned for steering on a two-wheel drive tractor, the hitch would cause the implement to follow the front wheels into a turn. This principle of convergence at the front axle was retained with the advent of the four-wheel drive articulated tractors.

In early articulated four-wheel drive tractors, it was quickly discovered that abrupt steering changes would often cause implement failures. It appeared that even minor abrupt articulation of the tractor while towing an implement would cause the implement to "wiggle" so as to impose high lateral impactive loads at the tractor-to-implement connection.

While the source of these lateral impactive loads was not determined, it was found that the implement failures could be reduced by modifying the steering system to prevent abrupt steering changes. Thus, the problem was solved at that time by treating symptoms.

As tractors have become larger, wider and wider implements have been developed and this problem has arisen again.

While developing the tractor hitch of the co-pending application Ser. No. 968,359, extensive modeling was used to evaluate the operation of the combination of an articulated tractor with an extra wide implement combination. During this modeling, it was discovered that the basic principle of draft link convergence at the front wheels may be the cause of the large lateral impactive loads. While there is still some controversy in this area, dynamic modeling appears to indicate that draft link convergence affects implement trailing and turning characteristics such that the implement does not respond to the direction of turn of the front wheels.

The rear wheels on an articulated tractor turn in an opposite direction from the front wheels due to the articulation. This means that when the rear wheels go into a turn, the implement which is secured to the rear section turns in the same direction as the rear section; i.e. the rear section of the tractor and the implement go in a direction different from the front wheels and the main body of the tractor. Thus, with changes in the articulation, the implement is always trying to tear itself away from the tractor.

Once this behavior is appreciated, it is apparent that the ideal convergence will be some place between the rear axis of the rear section of the tractor where the implement will exactly follow, on track, the rear section of the tractor.

Further modeling has indicated that the ideal position is probably between the rear axis and the articulation joint. When the new principle was tested in an actual vehicle, it was determined that the ideal convergence would be at the rear axis on a concrete surface but would move forward as a function of wheel slip in a plowed field because the covergence would then be related directly to the actual moving, turning location of the rear section relative to the ground. Since the wheel slip can vary from 5 to 15 percent or more, it is apparent that the actual position of convergence must be determined emperically based on the most desirable wheel slip conditions for the tractors. Unfortunately, the wheel slip conditions will be different in different places in the world.

SUMMARY OF THE INVENTION

The present invention provides an improved hitch in which large lateral loads are no longer imposed during turns by the implement by having draft link convergence related to the rear axle of the articulated tractor so as to cause the implement to be drawn around a turn in a substantially exact following relationship with the rear section of the tractor.

The above and additional advantages of the present invention will become apparent to those skilled in the art from a reading of the following detailed description when taken in conjunction with the accompanying drawings.

BRIEF DESCRIPTION OF THE DRAWINGS

FIG. 1 is a right side view of an agricultural four-wheel drive articulated tractor embodying the present invention; and FIG. 2 is a simplified plan view of the tractor showing the present invention.

DESCRIPTION OF THE PREFERRED EMBODIMENT

Referring now to FIG. 1, therein is shown a tractor 10 having a fore and aft extending body composed of a front section 12 and a rear section 14 connected by an articulation joint 16. The front section 12 carries an operator's cab 18 and is supported on a front axle 20 to which left and right front wheels 22 and 24 are secured.

The rear section 14 carries a hitch 26 and is carried on a rear axle 28 which is secured to left and right rear tires 30 and 32. The hitch 26 is a conventional three-point hitch which has an upper connector 34 and left and right couplers 36 and 38 mounted on a coupler frame 40.

Referring now to FIG. 2, therein is shown a plan view of the tractor 10 which shows the front section 12 having a front axis 42 around which the front axle 20 and the left and right front wheels 22 and 24 rotate. Behind the articulation joint 16 is the rear section 14 having a rear axis 44 around which the rear axle 28 and the left and right rear wheels 30 and 32 rotate.

In FIG. 2, the hitch 26 is shown to be connected to a wide agricultural implement 46 having left and right ends 48 and 50. The implement 46 has left and right implement connectors 52 and 54 which respectively engage with left and right couplers 36 and 38. The left and right couplers 36 and 38 are connected to fore and aft extending left and right draft links 56 and 58. The aft ends of the left and right draft links 56 and 58 are spaced apart by the coupler frame 40 and a coupler support 60. The forward ends of the left and right draft links 56 and 58 respectively contain left and right spherical bearings 62 and 64 by which they are connected to the left and right sides of the rear section 14 through a rockshaft 65.

When the tractor 10 is towing the implement 46, the loading on the tractor 10 will be along left and right lines of force 66 and 68 which respectively pass through the left coupler and spherical bearing 36 and 62 and the right coupler and spherical bearing 38 and 64. When the tractor is moving straight ahead, the left and right lines of force 66 and 68 converge and intersect at an intersection 70 which is located in front of the rear axis 44.

While the intersection 70 can be located anywhere in front of the rear axis 44, it has been found by an empirical approach that the benefits of draft link convergence decrease as the convergence is placed more than 75% of the distance from the rear axis 44 and the front axis 42. In a tractor, the ideal location of the intersection 70 will be in front of the rear axis 44 a distance which has been found to be emperically related to the percentage of slip of the left and right rear wheels 30 and 32.

In operation, with the tractor 10 moving straight ahead, small abrupt steering changes which cause a change in the angular position of the front section 12 relative to the rear section 14, will have no effect on the left and right ends 48 and 50 of the implement 46. The implement remains stable for minor steering corrections.

When the tractor is turned in making a steering direction change, in a dynamic situation the implement 46 will turn in the same direction as the front axis 42.

It is to be noted that because the left and right draft links 56 and 58 are movable on the left and right spherical bearings 62 and 64, as are the left and right couplers 36 and 38, the convergence during a turn will move rearwardly as well as laterally; thus, the intersection 70 is always established while the tractor 10 is in its straight ahead moving position.

While the invention has been described in conjunction with a specific embodiment, it is to be understood that many alternatives, modifications, and variations will be apparent to those skilled in the art in light of the foregoing description. Accordingly, it is intended to embrace all such alternatives, modifications, and variations which fall within the spirit and scope of the appended claims.

I claim:

1. An improved implement hitch for use on a four-wheel drive tractor which allows for better implement trailing and stability, said tractor having an articulated joint located approximately at the midpoint between fore-and-aft axles on which pairs of ground engaging wheels are rotatably mounted,
    (a) a pair of fore-and-aft extending draft links containing a pair of spherical bearings in the fore ends and a pair of couplers in the aft ends, said spherical bearings joining said draft links to a rockshaft traversely mounted on the rear of said four-wheel drive tractor, and said couplers coupling said draft links to a trailing implement;
    (b) means for supporting said aft ends of said draft links in a spaced relationship for enabling forces which act on said trailing implement to be transmitted through said draft links, said draft links defining two lines of force which extend forward into said four-wheel drive tractor and intersect at a point located between said aft axle and said articulation joint.

2. The hitch of claim 1 wherein said two lines of force intersect at a point directly proportional to wheel slip whereby greater wheel slip displaces said point forwardly of said aft axle.

* * * * *

UNITED STATES PATENT OFFICE
CERTIFICATE OF CORRECTION

Patent No. 4,219,212                    Dated  26 August 1980

Inventor(s)  Richard A. Schafer

It is certified that error appears in the above-identified patent and that said Letters Patent are hereby corrected as shown below:

Column 4, line 17, after "mounted," insert -- wherein said improved hitch comprises --.

*Signed and Sealed this*

*Third* Day of *February 1981*

[SEAL]

Attest:

Attesting Officer

RENE D. TEGTMEYER

*Acting Commissioner of Patents and Trademarks*

UNITED STATES PATENT AND TRADEMARK OFFICE
CERTIFICATE OF CORRECTION

PATENT NO. : 4,219,212
DATED : 26 August 1980
INVENTOR(S) : Richard A. Schafer

It is certified that error appears in the above—identified patent and that said Letters Patent is hereby corrected as shown below:

Column 2, line 57, delete "30 and 32" and insert -- 32 and 30 --.

Column 3, line 19, delete "30 and 32" and insert -- 32 and 30 --.

Signed and Sealed this

Fifteenth Day of June 1982

[SEAL]

Attest:

Attesting Officer

GERALD J. MOSSINGHOFF

Commissioner of Patents and Trademarks